(12) United States Patent
Sekine et al.

(10) Patent No.: US 11,667,102 B2
(45) Date of Patent: Jun. 6, 2023

(54) PREFORM AND METHOD OF MANUFACTURING FIBER-REINFORCED RESIN COMPOSITE MATERIAL

(71) Applicant: SUBARU CORPORATION, Tokyo (JP)

(72) Inventors: Naoyuki Sekine, Tokyo (JP); Keisuke Hamada, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 238 days.

(21) Appl. No.: 15/930,186

(22) Filed: May 12, 2020

(65) Prior Publication Data
US 2021/0031485 A1    Feb. 4, 2021

(30) Foreign Application Priority Data
Aug. 2, 2019    (JP) .............................. JP2019-142637

(51) Int. Cl.
*B32B 5/08*      (2006.01)
*B32B 27/34*     (2006.01)
(Continued)

(52) U.S. Cl.
CPC ............... *B32B 5/08* (2013.01); *B29C 70/08* (2013.01); *B32B 27/34* (2013.01); *B29K 2077/00* (2013.01); *B29K 2105/0872* (2013.01); *B29K 2277/00* (2013.01); *B29K 2995/0077* (2013.01); *B32B 2262/0261* (2013.01); *B32B 2307/54* (2013.01)

(58) Field of Classification Search
CPC .... B32B 5/08; B32B 5/12; B32B 5/22; B32B 5/26; B32B 27/02; B32B 27/06; B32B 27/08; D01F 8/12; Y10T 428/2929
See application file for complete search history.

(56) References Cited

U.S. PATENT DOCUMENTS

| | | | |
|---|---|---|---|
| 5,447,794 A * | 9/1995 | Lin | ..................... D02G 3/445 428/374 |
| 6,995,099 B1 * | 2/2006 | Nishimura | .............. B32B 5/024 442/60 |
| 2018/0126674 A1 | 5/2018 | Ohtani et al. | |

FOREIGN PATENT DOCUMENTS

EP       1 419 875 A1      5/2004
JP     2003080607 A  *   3/2003
(Continued)

OTHER PUBLICATIONS

Extended European Search Report dated Oct. 22, 2020 for European Patent Application No. 20177755.4-1009.

*Primary Examiner* — Alicia J Sawdon
(74) *Attorney, Agent, or Firm* — McGinn I.P. Law Group, PLLC.

(57) ABSTRACT

A preform includes a stack of a plurality of fiber materials. The fiber materials each include a first fiber layer including a reinforcing fiber and having a sheet shape, in which the reinforcing fiber has a melting point and a tensile strength that are higher than a melting point and a tensile strength of an aliphatic polyamide fiber, and a second fiber layer including the aliphatic polyamide fiber and having a sheet shape, and provided on at least one of surfaces of the first fiber layer. The aliphatic polyamide fiber includes a first polyamide resin and a second polyamide resin having a melting point higher than a melting point of the first polyamide resin by 7 degrees centigrade to 50 degrees centigrade.

10 Claims, 3 Drawing Sheets

(51) Int. Cl.
*B29C 70/08* (2006.01)
*B29K 77/00* (2006.01)
*B29K 105/08* (2006.01)
*B29K 277/00* (2006.01)

(56) References Cited

FOREIGN PATENT DOCUMENTS

| | | |
|---|---|---|
| JP | 4491968 B2 | 6/2010 |
| JP | 4517483 B2 | 8/2010 |
| JP | 4947163 B2 | 6/2012 |

* cited by examiner

FIG. 6

PREFORM AND METHOD OF MANUFACTURING FIBER-REINFORCED RESIN COMPOSITE MATERIAL

CROSS-REFERENCE TO RELATED APPLICATIONS

The present application claims priority from Japanese Patent Application No. 2019-142637 filed on Aug. 2, 2019, the entire contents of which are hereby incorporated by reference.

BACKGROUND

The technology relates to a preform, a fiber-reinforced resin composite material, and a method of manufacturing the fiber-reinforced resin composite material.

A preform is sometimes used upon manufacturing a fiber-reinforced resin composite material. The preform includes a stack of a plurality of fiber materials each having a base material and a non-woven fabric. The base material includes reinforcing fibers and has a sheet shape. The non-woven fabric includes organic fibers, and is provided on a surface of the base material.

In recent years, a technique has been proposed that uses fibers for a non-woven fabric structuring each of the fiber materials of the preform. Such fibers each include a core and a sheath. The core includes a predetermined resin, and the sheath includes a resin having a melting point lower than a melting point of the core. For example, reference is made to Japanese Patent Nos. 4491968, 4947163, and 4517483.

SUMMARY

An aspect of the technology provides a preform that includes a stack of a plurality of fiber materials. The fiber materials each include a first fiber layer including a reinforcing fiber and having a sheet shape, in which the reinforcing fiber has a melting point and a tensile strength that are higher than a melting point and a tensile strength of an aliphatic polyamide fiber, and a second fiber layer including the aliphatic polyamide fiber and having a sheet shape, and provided on at least one of surfaces of the first fiber layer. The aliphatic polyamide fiber includes a first polyamide resin and a second polyamide resin having a melting point higher than a melting point of the first polyamide resin by 7 degrees centigrade to 50 degrees centigrade.

An aspect of the technology provides a fiber-reinforced resin composite material that includes: a stack of a first fiber layer and a third fiber layer; and a matrix resin with which the first fiber layer and the third fiber layer are filled. The first fiber layer and the third fiber layer are stacked alternately. The first fiber layer includes a reinforcing fiber and has a sheet shape, in which the reinforcing fiber has a melting point and a tensile strength that are higher than a melting point and a tensile strength of an aliphatic polyamide fiber. The third fiber layer has a sheet shape, and the matrix resin is cured. The matrix resin includes a first polyamide resin that includes an aliphatic polyamide resin, and the third resin layer includes a second polyamide resin. The second polyamide resin includes an aliphatic polyamide resin and has a melting point higher than a melting point of the first polyamide resin by 7 degrees centigrade to 50 degrees centigrade.

An aspect of the technology provides a method of manufacturing a fiber-reinforced resin composite material. The method includes: preparing a preform that includes a stack of a plurality of fiber materials each including a first fiber layer including a reinforcing fiber and having a sheet shape, in which the reinforcing fiber has a melting point and a tensile strength that are higher than a melting point and a tensile strength of an aliphatic polyamide fiber, and a second fiber layer including the aliphatic polyamide fiber and provided on at least one of surfaces of the first fiber layer, in which the second fiber layer includes the aliphatic polyamide fiber that includes a first polyamide resin and a second polyamide resin having a melting point higher than a melting point of the first polyamide resin by 7 degrees centigrade to 50 degrees centigrade; filling a space inside the preform with a resin composition; heating the preform and the resin composition at a temperature that is higher than the melting point of the first polyamide resin and lower than the melting point of the second polyamide resin to melt the first polyamide resin; and curing, after the heating, a resultant mixture of the resin composition and the first polyamide resin.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

A preform that includes a stack of fiber materials each having a non-woven fabric, such as the non-woven fabric disclosed in each of Japanese Patent Nos. 4491968, 4947163, and 4517483, can suffer from insufficient feeding of a resin composition into a space upon filling the space inside the preform with the resin composition. Such insufficient feeding of the resin composition into the space can cause a void to be formed inside a thus-formed fiber-reinforced resin composite material.

The formation of the void can decrease impact resistance of the fiber-reinforced resin composite material, or can result in variations in impact resistance among products.

It is desirable to stably manufacture, using a preform, a fiber-reinforced resin composite material having high impact resistance.

In the following, some example embodiments of the technology are described in detail with reference to the accompanying drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description.

[Preform]

Figure 1:
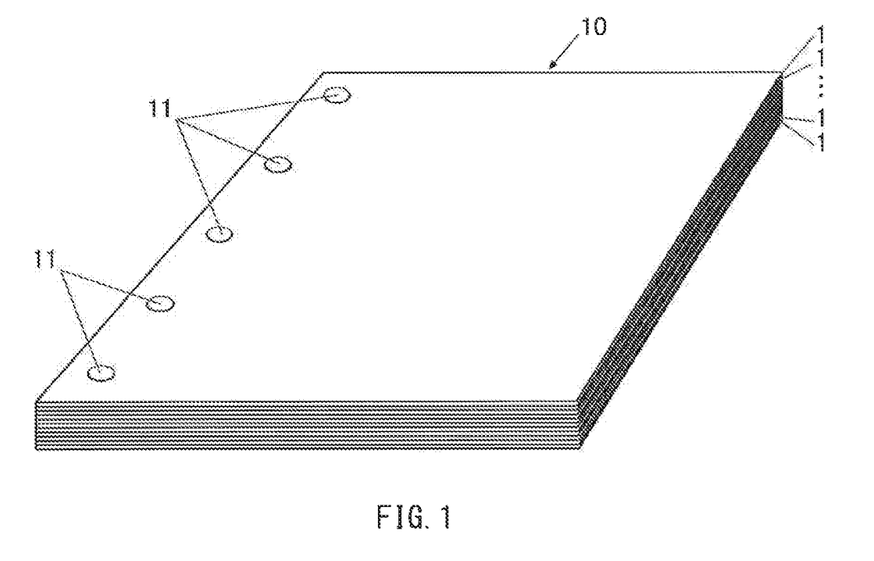
FIG. 1 is a perspective view of a preform according to one example embodiment of the technology.
Figure 2:
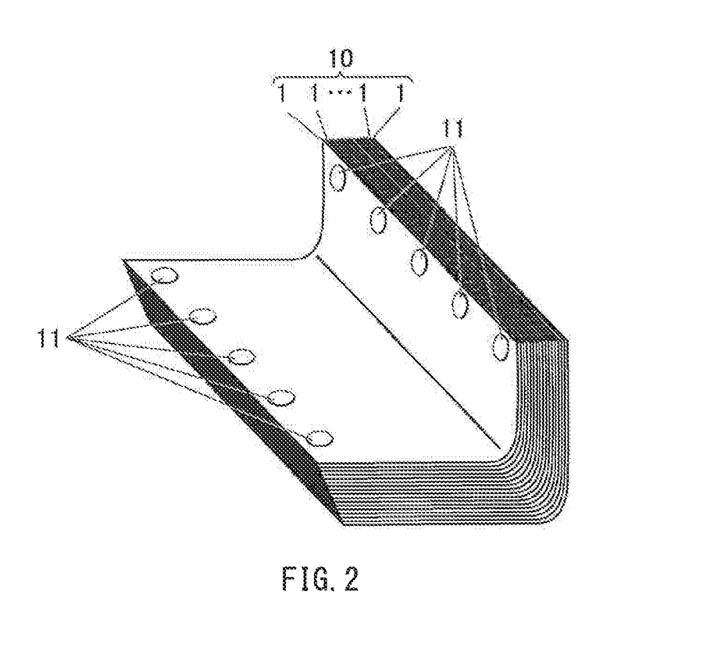
FIG. 2 is a perspective view of another preform according to one example embodiment.
Figure 3:
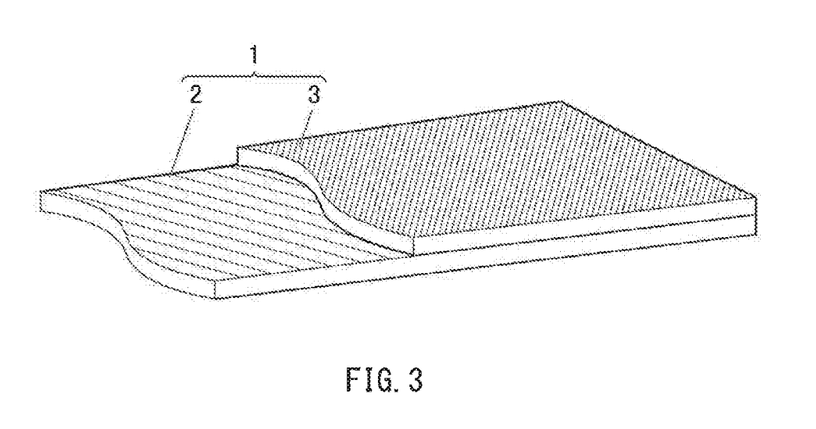
FIG. 3 is a partially-ruptured perspective view of a fiber material structuring the preform illustrated in FIG. 1 or FIG. 2.
Figure 4:
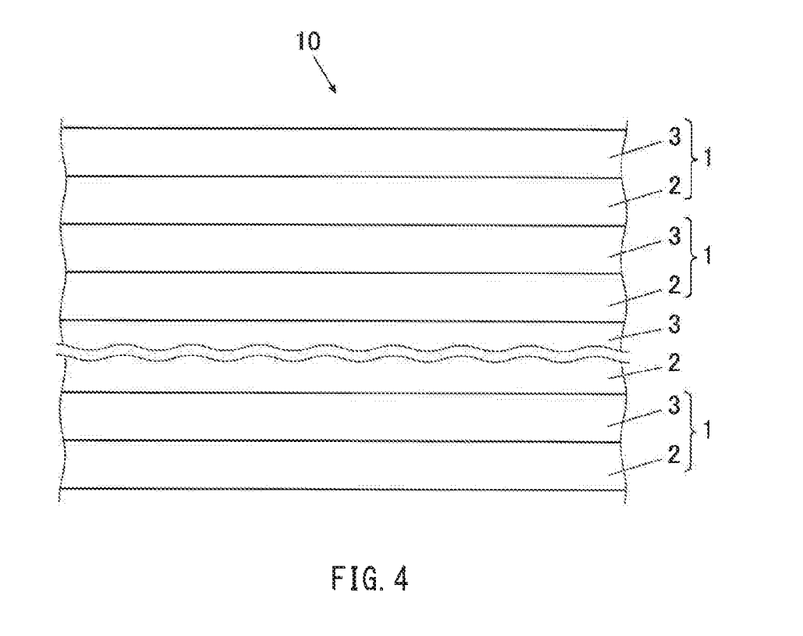
FIG. 4 is a schematic cross-sectional view of the preform illustrated in FIG. 1 or FIG. 2 and cut in a stack direction.
Figure 5:
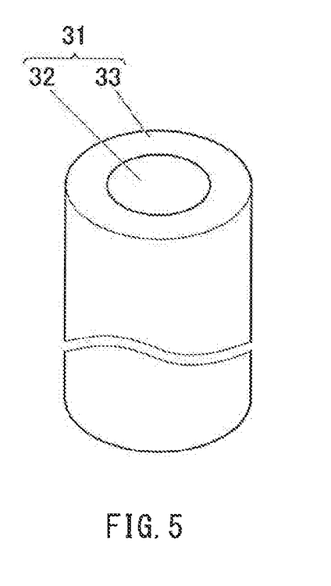
FIG. 5 is a perspective cross-sectional view of an aliphatic polyamide fiber structuring the fiber material illustrated in FIG. 3.

A description is given first of a preform 10 used for manufacturing of a fiber-reinforced resin composite material according to an example embodiment of the technology. FIGS. 1 and 2 are each a perspective view of the preform 10 according to an example embodiment. FIG. 3 is a partially-ruptured perspective view of a fiber material 1 structuring the preform 10. FIG. 4 is a schematic cross-sectional view of the preform 10 cut in a stack direction. FIG. 5 is a perspective cross-sectional view of an aliphatic polyamide fiber 31 structuring the fiber material 1.

Referring to FIG. 1 or FIG. 2, the preform 10 according to an example embodiment includes a stack of a plurality of fiber materials 1.

Note that a shape of the preform 10 may be determined depending on any intended use and is not particularly limited accordingly. For example, the preform 10 may have a flat-plate shape as illustrated in FIG. 1. In some embodiments, the preform 10 may be shaped to have a predetermined three-dimensional shape or may be bent, as illustrated in FIG. 2.

In one example, the preform 10 may have a combination of two or more shapes that are different from each other.

The preform 10 may include the stack of the fiber materials 1 that are rectangular in plan view as illustrated in FIG. 1. In an alternative example, the preform 10 may include the stack of strip-shaped fiber materials 1.

The preform 10 may be shaped to have an L-shape as viewed from a side as illustrated in FIG. 2. In an alternative example, the preform 10 may have any other shape as viewed from a side, such as a C-shape, a U-shape, or a hat (Ω) shape.

Upon manufacturing the shaped preform 10, the plurality of fiber materials 1 may be stacked in a state in which the plurality of fiber materials 1 is placed flat, following which the plurality of fiber materials 1 may be subjected to bending. In an alternative example, the plurality of fiber materials 1 bent in advance may be stacked, upon manufacturing the shaped preform 10.

The fiber materials 1 that are adjacent to each other in the preform 10 may be joined to each other in all or a part of a region of the preform 10. For example, the mutually-adjacent fiber materials 1 may be joined to each other in a region denoted by a reference numeral 11 in FIGS. 1 and 2. The region denoted by the reference numeral 11 will be hereinafter referred to as a joint 11.

In an example embodiment, one end of each of the fiber materials 1 may be fusion bonded, allowing the other end of each of the fiber materials 1 to move or shift with respect to the other end of the adjacent fiber material 1. This configuration allows for easier bending upon further processing the preform 10 having the flat-plate shape, and also prevents formation of a gap between the inner fiber material 1 and the outer fiber material 1 adjacent to the inner fiber material 1 upon further bending of the preform 10.

Note that a method of joining the fiber materials 1 is not limited to the fusion bonding. For example, a yarn may be threaded through the plurality of fiber materials 1 in a stack direction. In an alternative example, a resin other than a resin structuring the preform 10 may be used to adhere the fiber materials 1.

Figure 6:
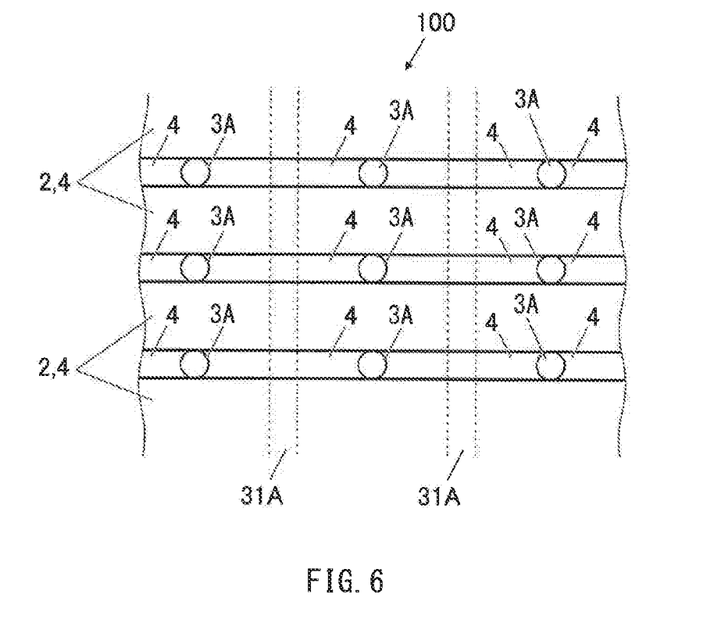
FIG. 6 is a schematic cross-sectional view of a fiber-reinforced resin composite material according to one example embodiment of the technology, which is manufactured using the preform illustrated in FIG. 1 or FIG. 2 and cut in a stack direction.

In some embodiments, a three-dimensional woven fabric may be used as the preform 10, instead of providing the joint 11. For example, the three-dimensional woven fabric may be available from Toyota Industries Corporation located in Aichi, Japan. Referring to FIG. 6, the three-dimensional woven fabric may include a first fiber layer 2, a second fiber layer 3, and a yarn 31A that penetrates through or stitches the first fiber layer 2 and the second fiber layer 3 in a stack direction thereof. The yarn 31A used for the three-dimensional woven fabric may include an organic material or an inorganic material. The use of the three-dimensional woven fabric having the yarn 31A makes it difficult to cause delamination of the fiber materials 1 in a fiber-reinforced resin composite material 100, thereby improving impact resistance of the fiber-reinforced resin composite material 100.

As illustrated in FIG. 1, a plurality of dot-shaped joints 11 may be provided along a side of the fiber materials 1. In an alternative example, one dot-shaped joint 11 may be provided along a side of the fiber materials 1, or the joint 11 may be provided linearly along a side of the fiber materials 1. In a yet alternative example, the joint 11 may be a planar joint 11 that extends not only along a side of the fiber materials 1 but also in a direction orthogonal to the side of the fiber materials 1. For example, the planar joint 11 may extend throughout the entire fiber materials 1.

As illustrated in FIG. 2, the joints 11 may be provided not only at one end of the fiber materials 1 but also at the other end of the fiber materials 1 to maintain its shape. In an alternative example where returning of a shape to its original shape after the shaping is less problematic, the joints 11 provided at the other end of the fiber materials 1 may be eliminated.

Referring to FIG. 3, the fiber materials 1 each include the first fiber layer 2 and the second fiber layer 3.

In the fiber materials 1 of an example embodiment, the second fiber layer 3 may be provided on only one surface of the first fiber layer 2.

The preform 10 according to an example embodiment may include the stack of the fiber materials 1 in which their respective orientations are matched with each other. Thus, the first fiber layer 2 and the second fiber layer 3 may be arranged alternately as illustrated in FIG. 4.

Note that providing the second fiber layer 3 on at least one of surfaces of the first fiber layer 2 suffices. In one example, the second fiber layer 3 may be provided on both surfaces of the first fiber layer 2.

It is to be also noted that stacking one first fiber layer 2 and one second fiber layer 3 alternately is not essential. In one example, a bundle of the first fiber layers 2 and the second fiber layer 3 may be stacked alternately.

A planar shape of each of the fiber materials 1 in an example embodiment may be determined depending on any shape of the preform 10 to be manufactured and is not particularly limited accordingly.

For example, the fiber materials 1 may be rectangular in a case of manufacturing the preform 10 illustrated in FIG. 1 or FIG. 2.

In one example, the fiber materials 1 each may have a strip shape in planar view as illustrated in FIG. 3. In an alternative example, the fiber materials 1 each may have a tow shape that is thinner than the strip-shaped fiber material 1.

The first fiber layer 2 according to an example embodiment includes a plurality of reinforcing fibers and has a sheet shape.

The reinforcing fibers each have a melting point and a tensile strength that are higher than those of the aliphatic polyamide fiber 31.

The reinforcing fiber may be an inorganic fiber such as a carbon fiber or a glass fiber, or may be an organic fiber such as an aramid fiber or a Vectran (Registered Trademark) fiber. In some embodiments, the reinforcing fiber may be a carbon fiber. One reason is that the carbon fiber allows for the fiber-reinforced resin composite material 100 which is light in weight and high in durability.

In one example, the reinforcing fibers may have a combination of two or more reinforcing fibers that are different in kind from each other.

Note that a method of forming the first fiber layer 2, such as a weaving method or a knitting method, a thickness of each of the reinforcing fibers, or any other factor of the first fiber layer 2 is optional.

The second fiber layer 3 according to an example embodiment includes the plurality of aliphatic polyamide fibers 31 and has a sheet shape. For example, the aliphatic polyamide fiber 31 may be a nylon fiber.

In one example, the second fiber layer 3 may be a non-woven fabric that includes the aliphatic polyamide fibers 31. In some embodiments, the second fiber layer 3 may include a woven fabric having woven aliphatic polyamide fibers 31, or include a knitted fabric having knitted aliphatic polyamide fibers 31. One reason is that the second fiber layer 3 including the woven fabric or the knitted fabric allows an amount of materials used in the fiber materials 1 to be even and allows for control of such amount of materials.

In some embodiments, the second fiber layer 3 may have the basis weight that is in a range from 3 g/m$^2$ to 30 g/m$^2$. One reason is that the second fiber layer 3 in this range improves toughness and impact resistance.

A lower limit of the maximum opening area of the second fiber layer 3 is not particularly limited. In some embodiments, the lower limit of the maximum opening area of the second fiber layer 3 may be equal to or greater than 0.2 mm$^2$. In some embodiments, the lower limit may be equal to or greater than 0.3 mm$^2$. One reason is that the lower limit of equal to or greater than 0.2 mm$^2$ improves an impregnation property in which the second fiber layer 3 and the first fiber layer 2 are impregnated with a resin composition, as described later in greater detail.

An upper limit of the maximum opening area of the second fiber layer 3 is not particularly limited. In some embodiments, the upper limit of the maximum opening area of the second fiber layer 3 may be equal to or less than 3 mm$^2$. In some embodiments, the upper limit may be equal to or less than 1.5 mm$^2$. One reason is that the upper limit of equal to or less than 3 mm$^2$ reduces the area of a region to be damaged attributed to application of an impact to the thus-obtained fiber-reinforced resin composite material 100, and increases Compression After Impact (hereinafter abbreviated as "CAI") as well.

A lower limit of an elongation rate in a longitudinal direction (or in a vertical direction) of the second fiber layer 3 is not particularly limited. In some embodiments, the lower limit of the elongation rate of the second fiber layer 3 may be equal to or greater than 5%. In some embodiments, the lower limit may be equal to or greater than 10%. One reason is that the lower limit of equal to or greater than 5% makes it difficult to cause a wrinkle in the fiber materials 1 upon manufacturing the preform 10, and thereby achieves the preform 10 having reduced unnecessary irregularities.

An upper limit of the elongation rate in the longitudinal direction of the second fiber layer 3 may be equal to or less than 100%.

The aliphatic polyamide fiber 31 structuring the second fiber layer 3 includes a first polyamide resin and a second polyamide resin having a melting point higher than a melting point of the first polyamide resin by 7 degrees centigrade to 50 degrees centigrade.

In some embodiments, the aliphatic polyamide fiber 31 may include: a core 32 that includes the second polyamide resin; and an outer peripheral part 33 that includes the first polyamide resin and covers the core 32, as illustrated in FIG. 5.

In some embodiments, the second polyamide resin structuring the core 32 may be polyamide 1010 or polyamide 6. The polyamide 1010 may have a malting point of 202 degrees centigrade (hereinafter referred to as PA1010), and the polyamide 6 may have a melting point of 225 degrees centigrade (hereinafter referred to as PA6).

In some embodiments, the first polyamide resin structuring the outer peripheral part 33 may be polyamide 12. The polyamide 12 may have a melting point of 176 degrees centigrade (hereinafter referred to as PA12).

In some embodiments, a ratio of the mass of the first polyamide resin (i.e., the outer peripheral part 33) included in the aliphatic polyamide fiber 31 and the mass of the second polyamide resin (i.e., the core 32) included in the aliphatic polyamide fiber 31 may be in a range from 30:70 to 70:30. In some embodiments, the ratio may be 50:50. One reason is that the ratio of 50:50 improves a fusion bonding property and helps to ensure a sufficient space as described later in greater detail.

In some embodiments, the first fiber layer 2 and the second fiber layer 3 of each of the fiber materials 1 may be joined to each other in all or a part of a region of corresponding one of the fiber materials 1.

For example, a region of the joint 11 in which the fiber materials 1 are joined to each other and a region, in each of the fiber materials 1, in which the first fiber layer 2 and the second fiber layer 3 are joined to each other may be the same as each other or may be different from each other.

In an example embodiment, the first fiber layer 2 and the second fiber layer 3 may be joined to each other through fusion bonding as with the joining of the fiber materials 1. In an alternative example, a method of joining the fiber materials 1 and a method of joining the first fiber layer 2 and the second fiber layer 3 in each of the fiber materials 1 may be different from each other.

In an example embodiment, the fusion bonding of the fiber materials 1 and the fusion bonding of the first fiber layer 2 and the second fiber layer 3 are performed at a temperature that is higher than the melting point of the first polyamide resin (i.e., the outer peripheral part 33) and lower than the melting point of the second polyamide resin (i.e., the core 32).

With this configuration, the outer peripheral part 33 of the aliphatic polyamide fiber 31 is once melted and cured again in the joint 11, allowing the fiber materials 1, or the first fiber layer 2 and the second fiber layer 3, to be joined to each other while allowing a shape of the core 32 to be maintained as it is without causing melting of the core 32.

The preform 10 according to an example embodiment includes the stack of the fiber materials 1 in which the first fiber layer 2 and the second fiber layer 3 are arranged alternately. Thus, the core 32 may be interposed between the first fiber layers 2 that are adjacent to each other in the joint 11, allowing the mutually-adjacent first fiber layers 2 to be separated away from each other at least by an amount corresponding to the thickness of the core 32.

Note that, in a region excluding the joint 11 in the preform 10, the aliphatic polyamide fiber 31 may be interposed as it is (i.e., without involving the melting of the outer peripheral part 33) between the first fiber layers 2 that are adjacent to each other, allowing the mutually-adjacent first fiber layers 2 to be separated away from each other at least by an amount corresponding to a thickness of the second fiber layer 3.

[Fiber-Reinforced Resin Composite Material]

A description is given next of the fiber-reinforced resin composite material 100 according to an example embodiment. FIG. 6 is a schematic cross-sectional view of the fiber-reinforced resin composite material 100 cut in the stack direction.

Referring to FIG. 6, the fiber-reinforced resin composite material 100 includes: a stack of the plurality of first fiber layers 2 and a plurality of third fiber layers 3A; and a matrix resin 4 with which the first fiber layers 2 and the third fiber layers 3A are filled. The first fiber layers 2 and the third fiber layers 3A are stacked alternately in the fiber-reinforced resin composite material 100. The third fiber layers 3A each have a sheet shape. The matrix resin 4 is cured.

It is to be noted that one first fiber layer 2 and one third fiber layer 3A are stacked alternately in an example embodiment illustrated in FIG. 6. In another example, a bundle of the first fiber layers 2 and the third fiber layer 3A may be stacked alternately.

The first fiber layers 2 each may correspond to the first fiber layer 2 of the first preform 10.

The third fiber layers 3A each may include the second polyamide resin.

In an example embodiment, the third fiber layers 3A each may include the aliphatic polyamide fiber 31 derived from the second fiber layer 3 and from which the outer peripheral part 33 is removed. In other words, the third fiber layers 3A each may include only the core 32.

As described previously, the first fiber layer 2 and the third fiber layer 3A are stacked alternately, allowing the third fiber layer 3A to be interposed between the first fiber layers 2 that are adjacent to each other.

Thus, the mutually-adjacent first fiber layers 2 may be separated away from each other at least by an amount corresponding to a thickness of the third fiber layer 3A.

The matrix resin 4 includes the first polyamide resin as an aliphatic polyamide resin. The matrix resin 4 may also include a resin composition.

The first polyamide resin included in the matrix resin 4 may have formerly formed the outer peripheral parts 33 of the respective aliphatic polyamide fibers 31 of the second fiber layers 3.

As described previously, the mutually-adjacent first fiber layers 2 may be separated away from each other, allowing not only the first fiber layers 2 to be impregnated with the matrix resin 4 but also allowing a space between the mutually-adjacent first fiber layers 2 to be filled with the matrix resin 4.

The resin composition is not particularly limited, and any known resin composition may be used. In some embodiments, the resin composition may include: a benzoxazine resin including a compound having a benzoxazine ring expressed by the following formula (1) in a molecule; an epoxy resin; a curing agent having two or more phenolic hydroxyl groups in a molecule; and a toughness improver. One reason is that such a resin composition is advantageous in terms of flame retardancy and low contractility. In the following, such a resin composition is referred to as a benzoxazine resin composition.

(1)

In the formula (1), $R_1$ denotes a chain alkyl group having 1 to 12 carbon atoms, a cyclic alkyl group having 3 to 8 carbon atoms, a phenyl group, a phenyl group substituted with the chain alkyl group having 1 to 12 carbon atoms, or a phenyl group substituted with a halogen. In addition, a hydrogen atom is bonded to at least one of a carbon atom in the ortho position or a carbon atom in the para position of a carbon atom, in an aromatic ring in the formula, to which an oxygen atom is bonded.

[Method of Manufacturing Fiber-Reinforced Resin Composite Material]

A description is given next of a method of manufacturing the fiber-reinforced resin composite material 100 according to an example embodiment.

The fiber-reinforced resin composite material 100 may be manufactured using the preform 10 and any manufacturing method, such as a Resin Transfer Molding (RTM).

For example, the preform 10 is prepared first.

In other words, the preform 10 is prepared in which the second fiber layer 3 includes the aliphatic polyamide fiber 31 and has the sheet shape. The aliphatic polyamide fiber 31 includes the first polyamide resin and the second polyamide resin having the melting point higher than the melting point of the first polyamide resin by 7 degrees centigrade to 50 degrees centigrade.

After preparing the preform 10, a space inside the preform 10 is filled with the resin composition.

In an example embodiment, the preform 10 may be placed in a mold and the resin composition may be injected into the mold with pressure. Thus, the space inside the preform 10 may be filled with the resin composition. For example, the space in the first fiber layers 2 structuring the preform 10 and the space in the second fiber layers 3 structuring the preform 10 may be thereby filled with the resin composition.

As described previously, the first fiber layers 2 that are adjacent to each other may be separated away from each other not only in regions other than the joints 11 but also at the joints 11 in the preform 10 according to an example embodiment. Accordingly, the space between the first fiber layers 2 (or the space in the second fiber layers 3) may serve as a flow passage of the injected resin composition, allowing the preform 10 to be easily impregnated with the resin composition. This also eliminates processes of attaching and removing an existing net-like flow medium that facilitates spreading of the resin composition.

The mold may be subjected to vacuuming upon filling the preform 10 with the resin composition.

After impregnating the preform 10 with the resin composition, the preform 10 and the resin composition are heated at the temperature (i.e., a heating temperature) that is higher than the melting point of the first polyamide resin and lower than the melting point of the second polyamide resin to melt the first polyamide resin that forms the outer peripheral parts 33 of the aliphatic polyamide fibers 31.

In an example embodiment, a temperature may be increased from a room temperature to the heating temperature at a predetermined heat-up rate, following which heating is performed under pressure at the heating temperature for a predetermined time to melt the first polyamide resin.

Upon the heating, the cores 32 remain without involving melting, thereby maintaining the separation between the first fiber layers 2 that are adjacent to each other and thus allowing the resin composition present between the mutually-adjacent first fiber layers 2 to remain without being squeezed out by the mutually-adjacent first fiber layers 2.

In addition, the thus-melted first polyamide resin mixes with the resin composition to structure the matrix resin 4.

Thereafter, the resultant mixture of the resin composition and the first polyamide resin is cured.

In one example where the resin composition includes a thermoplastic resin, the matrix resin 4 may be cured by cooling. In an alternative example where the resin composition includes a thermosetting resin, such as the benzoxazine resin composition, the application of pressure and the heating may be continued to perform the curing.

Curing the mixture of the resin composition and the melted first polyamide resin may result in the formation of the matrix resin 4. The fiber-reinforced resin composite material 100 may be thus manufactured by the example processes described above.

The preform 10 according to an example embodiment described above includes the second fiber layer 3 (or the core 32 at the joint 11) interposed between the first fiber layers 2 that are adjacent to each other, allowing the mutually-adjacent first fiber layers 2 to be separated away from each other. Thus, the space between the first fiber layers 2 (or the space in the second fiber layers 3) may serve as the flow passage of the injected resin composition, allowing the preform 10 to be easily impregnated with the resin composition and thereby makes it difficult to cause a void (a region unfilled with the resin) inside the thus-manufactured fiber-reinforced resin composite material 100. Hence, it is possible to stably manufacture the fiber-reinforced resin composite material 100 having high impact resistance.

EXAMPLES

A description is given next of some specific but non-limiting Examples of characteristics of the fiber-reinforced resin composite material 100.

The benzoxazine resin composition was manufactured first that eventually serves as a part of the matrix resin 4. The benzoxazine resin composition was obtained through heating and mixing of the following raw materials at a proportion represented in the Table 1 described below.

(A) component: benzoxazine resin composition
  F-a: bisphenol F-aniline type solid benzoxazine (F-a type solid benzoxazine), available from Shikoku Chemicals Corporation located in Kagawa, Japan
  P-a: phenol aniline type solid benzoxazine (P-a type solid benzoxazine), available from Shikoku Chemicals Corporation located in Kagawa, Japan
(B) component: epoxy resin
  2021P: liquid epoxy "CELLOXIDE" (Registered Trademark) 2021P, available from Daicel Corporation located in Osaka, Japan (C) component: curing agent
  BPF: 9,9-bis(4-hydroxyphenyl) fluorene, available from Osaka Gas Chemicals Co., Ltd. located in Osaka, Japan
(D) component: toughness improver
  YP70: phenoxy resin (YP-70), available from NIPPON STEEL Chemical &
  Material Co., Ltd. located in Tokyo, Japan

TABLE 1

| Name of Raw Material | Manufacturer | Combination Rate |
|---|---|---|
| Solid benzoxazine (F-a) | Shikoku Chemicals Corporation | 60 |
| Solid benzoxazine (P-a) | Shikoku Chemicals Corporation | 15 |
| Liquid epoxy (Celloxide 2021P) | Daicel Corporation | 25 |
| Curing agent BPF (bis(4-hydroxyphenyl) fluorene) | Osaka Gas Chemicals Co., Ltd. | 10 |
| Phenoxy resin (YP-70) | NIPPON STEEL Chemical & Material Co., Ltd. | 5 |

In addition, a part of the benzoxazine resin composition was mixed with the following polyamide resin particles (E1 and E2 components or E1 and E3 components) to obtain other benzoxazine resin compositions as well.

In the following, the benzoxazine resin composition containing no polyamide resin particles is referred to as a first resin composition, the benzoxazine resin composition containing the E1 component and the E2 component is referred to as a second resin composition, and the benzoxazine resin composition containing the E1 component and the E3 component is referred to as a third resin composition.

(E) components: polyamide resin particles
(E1) component: polyamide 12 resin particles (hereinafter referred to as "PA12" particles)
  VESTOSINT (Registered Trademark) 2158 having a mean particle size of 20 micrometers, available from Daicel-Evonik Ltd. located in Tokyo, Japan
  VESTOSINT (Registered Trademark) 2159 having a mean particle size of 10 micrometers, available from Daicel-Evonik Ltd. located in Tokyo, Japan
(E2) component: polyamide 1010 resin particles (hereinafter referred to as "PA1010" particles)
  VESTOSINT (Registered Trademark) 9158 having a mean particle size of 20 micrometers, available from Daicel-Evonik Ltd. located in Tokyo, Japan
(E3) component: polyamide 6 resin particles (hereinafter referred to as "PA6" particles)

Flat-plate-shaped fiber-reinforced resin composite materials according to Examples 1 and 2 and Comparative Examples 1 to 3 (hereinafter referred to as "samples") were fabricated on the basis of the specifications represented in Table 2 below.

Note that six fiber-reinforced resin composite materials were fabricated for each sample.

The samples according to the Example 1 were each manufactured using the preform 10 according to an example embodiment described above, which included the stack of the plurality of fiber materials 1.

The first fiber layer 2 structuring each of the fiber materials 1 was HiTape (Registered Trademark), available from Hexcel Corporation located in Anderson, South Carolina. The HiTape had the basis weight of the reinforcing fibers of 210 g/m². The second fiber layer 3 was the knitted fabric that had the aliphatic polyamide fibers 31 each having the core 32 including the PA1010 and the outer peripheral part 33 including the PA12. The weight ratio of the cores 32 and the outer peripheral parts 33 was 50:50.

The space in the preform 10 was filled with the first resin composition as the benzoxazine resin composition.

The curing conditions included: increasing a temperature to 185 degrees centigrade at a heat-up rate of 1 degree centigrade per minute (1° C./min.); and curing by performing heating under pressure for two hours while keeping the increased temperature.

The samples according to the Example 2 were each manufactured using the preform 10 according to an example embodiment described above, which included the stack of the plurality of fiber materials 1, as with the samples according to the Example 1.

The first fiber layer 2 structuring each of the fiber materials 1 was HiTape as with the Example 1. The second fiber layer 3 was the knitted fabric that had the aliphatic polyamide fibers 31 each having the core 32 and the outer peripheral part 33 including the PA12. Unlike the Example 1, the cores 32 each included PA6. The weight ratio of the cores 32 and the outer peripheral parts 33 was 50:50.

The benzoxazine resin composition used for the filling and the curing conditions were similar to those of the Example 1.

The samples according to the Comparative Example 1 were each manufactured using a preform that included a stack of only a plurality of first fiber layers 2. The first fiber layers 2 each included the HiTape as with the Examples 1 and 2. In other words, the samples were each manufactured using the preform that had no second fiber layer 3 between the HiTapes.

The benzoxazine resin composition used for the filling and the curing conditions were similar to those of the Examples 1 and 2.

The samples according to the Comparative Example 2 were each manufactured using a stack that included only a plurality of prepregs. The prepregs included sheet-shaped reinforcing fibers that were each impregnated with the second resin composition. In other words, the samples were each manufactured using the stack that had no second fiber layer 3 between the reinforcing fibers.

The curing conditions were similar to those of the Examples 1 and 2 and the Comparative Example 1.

The samples according to the Comparative Example 3 were each manufactured using a stack that included only a plurality of prepregs. The prepregs included the reinforcing fibers that were similar to those of the Comparative Example 2 but were each impregnated with the third resin composition. In other words, the samples were each manufactured using the stack that had no second fiber layer 3 between the reinforcing fibers.

The curing conditions were similar to those of the Examples 1 and 2 and the Comparative Examples 1 and 2.

TABLE 2

| | | | | | | Sample | | | | |
|---|---|---|---|---|---|---|---|---|---|---|
| | | Basis Weight of Reinforcing Fibers [g/m$^2$] | Resin Content [wt %] | Fibers | General Resin Component | Polyamide (PA) | | | CAI | |
| | Fiber Material | | | | | Particles | Basis Weight [g/m$^2$] | Knitted Fabric | Basis Weight [g/m$^2$] | Average [MPa] | Rate of Variation [%] |
| Example 1 | RTM material (HiTape) | 210 | 35.5 | IM7 | Benzoxazine resin | — | — | 1010/12 | 5.5 | 334 | 4.1 |
| Example 2 | RTM material (HiTape) | 210 | 35.5 | IM7 | Benzoxazine resin | — | — | 6/12 | — | 311 | — |
| Comparative Example 1 | RTM material (HiTape) | 210 | 35.5 | IM7 | Benzoxazine resin | — | — | — | — | 177 | 5.8 |
| Comparative Example 2 | Prepreg | 150 | 35.5 | IMS65 | Benzoxazine resin | 1010/12 | — | — | — | 314 | 5.5 |
| Comparative Example 3 | Prepreg | 150 | 35.5 | IMS65 | Benzoxazine resin | 6/12 | — | — | — | 291 | 2.6 |

Thereafter, an impact was applied to the middle of each of the samples to measure the CAI of each of the samples. The experiment was conducted in compliance with ASTM D7136 and ASTM D7137 and conducted under Room Temperature, Dry (RTD). The impact applied to each of the samples had energy of 6.7 J/m$^2$.

The experiment included applying the impacts based on the same conditions to the respective six samples fabricated on the basis of the same conditions, and calculating, from thus-obtained respective measurement values, an average and a rate of variation (i.e., variations in CAI among the samples) of the measurement values.

A comparison result on an average of the CAIs of the respective samples revealed that an average of the CAIs of the samples according to the Comparative Example 1 was below 200 MPa as represented in the Table 2.

In contrast, the CAIs of the samples according to the Examples 1 and 2 and the Comparative Examples 2 and 3 greatly exceeded the CAIs of the samples according to the Comparative Example 1. It is to be noted that averages of the CAIs of the samples according to the Examples 1 and 2 and the Comparative Examples 2 and 3 each exceeded 290 MPa.

In particular, the CAIs of the samples according to the Examples 1 and 2 and the Comparative Example 2 were greater than 310 MPa, which result revealed that those samples, i.e., the fiber-reinforced resin composite materials, are able to withstand any practical use sufficiently.

In addition, a comparison result on the rate of variation of the CAIs of the respective samples revealed that the rate of variation of the measurement values, i.e., the variations among the CAIs, of each of the samples according to the Comparative Examples 1 and 2 was 5.5% or greater and was relatively high accordingly, as represented in the Table 2. In contrast, the rate of variation of the measurement values of each of the samples according to the Example 1 and the Comparative Example 3 was 4.1% or less and was low accordingly.

In view of the foregoing results, it was found that the fiber-reinforced resin composite material 100 according to at least one embodiment of the technology has high impact resistance, which is about the same as that of an existing fiber-reinforced resin composite material manufactured by a prepreg impregnated with the benzoxazine resin composition that includes the PA1010 and the PA12 particles or the PA6 and the PA12 particles.

The second fiber layer 3 in at least one embodiment of the technology allows for manufacturing at low costs as compared with a case where the PA1010 particles, the PA12 particles, or the PA6 particles are used. Accordingly, the fiber-reinforced resin composite material 100 according to at least one embodiment of the technology that is free from using those particles makes it possible to achieve, at lower costs, the impact resistance that is about the same as that of any existing fiber-reinforced resin composite material.

In particular, it was found that the second fiber layer 3 including the aliphatic polyamide fibers 31 each having the core 32 that includes the PA1010 and the outer peripheral part 33 that includes the PA12 makes it possible to manufacture the fiber-reinforced resin composite material 100 having the high impact resistance more stably, i.e., with a reduced quality variation.

According to at least one embodiment of the technology, it is possible to stably manufacture the fiber-reinforced resin composite material having high impact resistance.

Although some example embodiments of the technology have been described in the foregoing by way of example with reference to the accompanying drawings, the technology is by no means limited to the embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A preform comprising
a stack of a plurality of fiber materials each including:
    a first fiber layer including a reinforcing fiber and having a sheet shape, the reinforcing fiber having a melting point and a tensile strength that are higher than a melting point and a tensile strength of an aliphatic polyamide fiber; and
    a second fiber layer including the aliphatic polyamide fiber and having a sheet shape, and provided on at least one surface of the first fiber layer,
wherein the aliphatic polyamide fiber includes an outer peripheral part including a first polyamide resin, and a core including a second polyamide resin and covered by the outer peripheral part,
wherein the first polyamide resin is polyamide 12, and the second polyamide resin is at least one of polyamide 1010 and polyamide 6, and
wherein a ratio of mass of the first polyamide resin included in the aliphatic polyamide fiber and mass of the second polyamide resin included in the aliphatic polyamide fiber is in a range from 30:70 to 70:30.

2. The preform according to claim 1, wherein the second polyamide resin is polyamide 1010.

3. The preform according to claim 1, wherein the second fiber layer comprises a woven fabric having a woven aliphatic polyamide fiber or a knitted fabric having a knitted aliphatic polyamide fiber.

4. The preform according to claim 1, wherein the second fiber layer has basis weight that is in a range from 3 g/m$^2$ to 30 g/m$^2$.

5. The preform according to claim 1, wherein the second fiber layer has maximum opening area that is in a range from 0.2 mm$^2$ to 3 mm$^2$.

6. The preform according to claim 1, wherein the first fiber layer and the second fiber layer are joined to each other in all or a part of a region of corresponding one of the fiber materials.

7. The preform according to claim 6, wherein the first fiber layer and the second fiber layer are joined to each other at their respective one ends.

8. The preform according to 6, wherein the preform is shaped to have a predetermined three-dimensional shape.

9. The preform according to 7, wherein the preform is shaped to have a predetermined three-dimensional shape.

10. A method of manufacturing a fiber-reinforced resin composite material, the method comprising:
    preparing the preform according to claim 1;
    filling a space inside the preform with a resin composition;
    heating the preform and the resin composition at a temperature that is higher than the melting point of the first polyamide resin and lower than the melting point of the second polyamide resin to melt the first polyamide resin; and
    curing, after the heating, a resultant mixture of the resin composition and the first polyamide resin.

* * * * *